US012707010B2

(12) United States Patent
Ballinger et al.

(10) Patent No.: US 12,707,010 B2
(45) Date of Patent: Aug. 11, 2026

(54) SYSTEM AND METHOD FOR DUAL-DEVICE COMMUNICATION SYNCHRONIZATION

(71) Applicant: Wells Fargo Bank, N.A., San Francisco, CA (US)

(72) Inventors: Kristin Ann Ballinger, Antelope, CA (US); Jeremy J. Berry, Huntersville, NC (US); Bradley M. Bevington, Edwardsville, IL (US); Germaine S. Chee, Mill Valley, CA (US); Tyua Larsen Fraser, Livermore, CA (US); Joel Scott Gardner, Charlotte, NC (US); Carrie Marie Nolan, Chittenango, NY (US); Stephen Lloyd Sloan, University City, MO (US); Everett Allen Storie, Fort Mill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 145 days.

(21) Appl. No.: 18/661,291

(22) Filed: May 10, 2024

(65) Prior Publication Data

US 2025/0350684 A1 Nov. 13, 2025

(51) Int. Cl.
*H04M 3/493* (2006.01)

(52) U.S. Cl.
CPC .... *H04M 3/4936* (2013.01); *H04M 2203/558* (2013.01); *H04M 2203/6054* (2013.01)

(58) Field of Classification Search
CPC ......... H04M 3/4936; H04M 2203/558; H04M 2203/605; H04M 2203/6054; H04M 1/72454
See application file for complete search history.

(56) References Cited

U.S. PATENT DOCUMENTS

| | | | | |
|---|---|---|---|---|
| 7,809,842 | B2 * | 10/2010 | Moran | H04L 67/14 709/227 |
| 10,133,612 | B2 * | 11/2018 | Wood | G06F 3/167 |

(Continued)

FOREIGN PATENT DOCUMENTS

| | | |
|---|---|---|
| CN | 116487048 | 7/2023 |
| JP | 7299245 | 6/2023 |
| KR | 102260535 | 6/2021 |

OTHER PUBLICATIONS

"SeniorTalk", [Online]. Retrieved from the Internet: https: www.senior-talk.com #:~:text=It's%20SeniorTalk.,of%20our%20chat%20AI%20assistant., (accessed on Jan. 22, 2024), 4 pages.

(Continued)

*Primary Examiner* — Akelaw Teshale
(74) *Attorney, Agent, or Firm* — SCHWEGMAN LUNDBERG & WOESSNER, P.A.

(57) ABSTRACT

A method may include: receiving voice user interaction data via a virtual assistant from a first device of a user; processing, the voice user interaction data to determine an intent of the user associated with a task type; determining that a dual-device-communication session should be established based on the intent; transmitting a notification to a second device of the user including an electronic link to establish the session; receiving an indication of activation of the electronic link; in response to receiving the indication, establishing the session with the first device and the second device, the session associated with an instance of the task type; receiving task data from the first device via the virtual assistant associated with the task type; and in response to receiving the task data, presenting an outcome of processing the task data, the outcome presented on a user interface on the second device.

20 Claims, 4 Drawing Sheets

(56) References Cited

U.S. PATENT DOCUMENTS

| | | | | |
|---|---|---|---|---|
| 10,586,535 | B2 * | 3/2020 | Kudurshian | G10L 13/02 |
| 10,831,839 | B1 | 11/2020 | Ogawa et al. | |
| 11,641,535 | B2 * | 5/2023 | van Scheltinga | H04W 8/205 370/352 |
| 12,001,933 | B2 * | 6/2024 | Sanghavi | G06F 40/30 |
| 2014/0279050 | A1 | 9/2014 | Makar et al. | |
| 2014/0359637 | A1 * | 12/2014 | Yan | G06F 9/4881 718/108 |
| 2015/0186156 | A1 * | 7/2015 | Brown | H04L 51/02 715/706 |
| 2017/0357534 | A1 * | 12/2017 | Gupta | G06F 9/5027 |
| 2018/0253333 | A1 * | 9/2018 | Gupta | G06F 9/4856 |
| 2019/0102684 | A1 | 4/2019 | Beran et al. | |
| 2019/0371315 | A1 * | 12/2019 | Newendorp | G10L 15/1815 |
| 2020/0356608 | A1 | 11/2020 | Ogawa et al. | |
| 2023/0052903 | A1 | 2/2023 | Mazumder et al. | |
| 2023/0058929 | A1 * | 2/2023 | Lasko | G06F 40/35 |
| 2023/0161798 | A1 | 5/2023 | Vangala et al. | |
| 2024/0311841 | A1 * | 9/2024 | Shanthraj | G06F 9/453 |

OTHER PUBLICATIONS

Calatrava-Nicolas, Francisco, "Robotic-Based Well-Being Monitoring and Coaching System for the Elderly in Their Daily Activities", Sensors 2021, 21(20), 6865; https: doi.org 10.3390 s21206865, (Oct. 16, 2021), 38 pages.

Garcia Mendez, Silvia, "Entertainment Chatbot for the Digital Inclusion of Elderly People Without Abstraction Capabilities", IEEE Access, vol. 9, pp. 75878-75891, 2021, doi: 10.1109 ACCESS. 2021.3080837, (May 17, 2021), 14 pages.

Maier, Torsten, "An Exploration of Cognitive Assistants and Their Challenges", Student Dissertation The Pennsylvania State University https: etda.libraries.psu.edu files final_submissions 24149, (Aug. 2021), 124 pages.

Miura, Chisaki, "Assisting Personalized Healthcare of Elderly People: Developing a Rule-Based Virtual Caregiver System Using Mobile Chatbot", Sensors 2022, 22,3829. https: doi.org 10.3390 s22103829, (May 18, 2022), 19 pages.

Teja, Bhanu, "Build A Customer Support Chatbot Using Machine Learning", [Online]. Retrieved from the Internet: https: sitegpt.ai blog customer-support-chatbot-using-machine-learning, (Oct. 26, 2023), 41 pages.

* cited by examiner

SYSTEM AND METHOD FOR DUAL-DEVICE COMMUNICATION SYNCHRONIZATION

BACKGROUND

Interactive Voice Response (IVR) systems enable customers to resolve service issues without human intervention. Through voice commands or keypad inputs, users navigate a menu offering various services such as account information, payments, and troubleshooting. The system directs calls based on user selections, facilitating swift issue resolution. For example, customers can autonomously update personal details or check account balances.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Like numerals having different letter suffixes may represent different instances of similar components. Some embodiments are illustrated by way of example, and not limitation, in the figures of the accompanying drawings.

DETAILED DESCRIPTION

Figure 1:
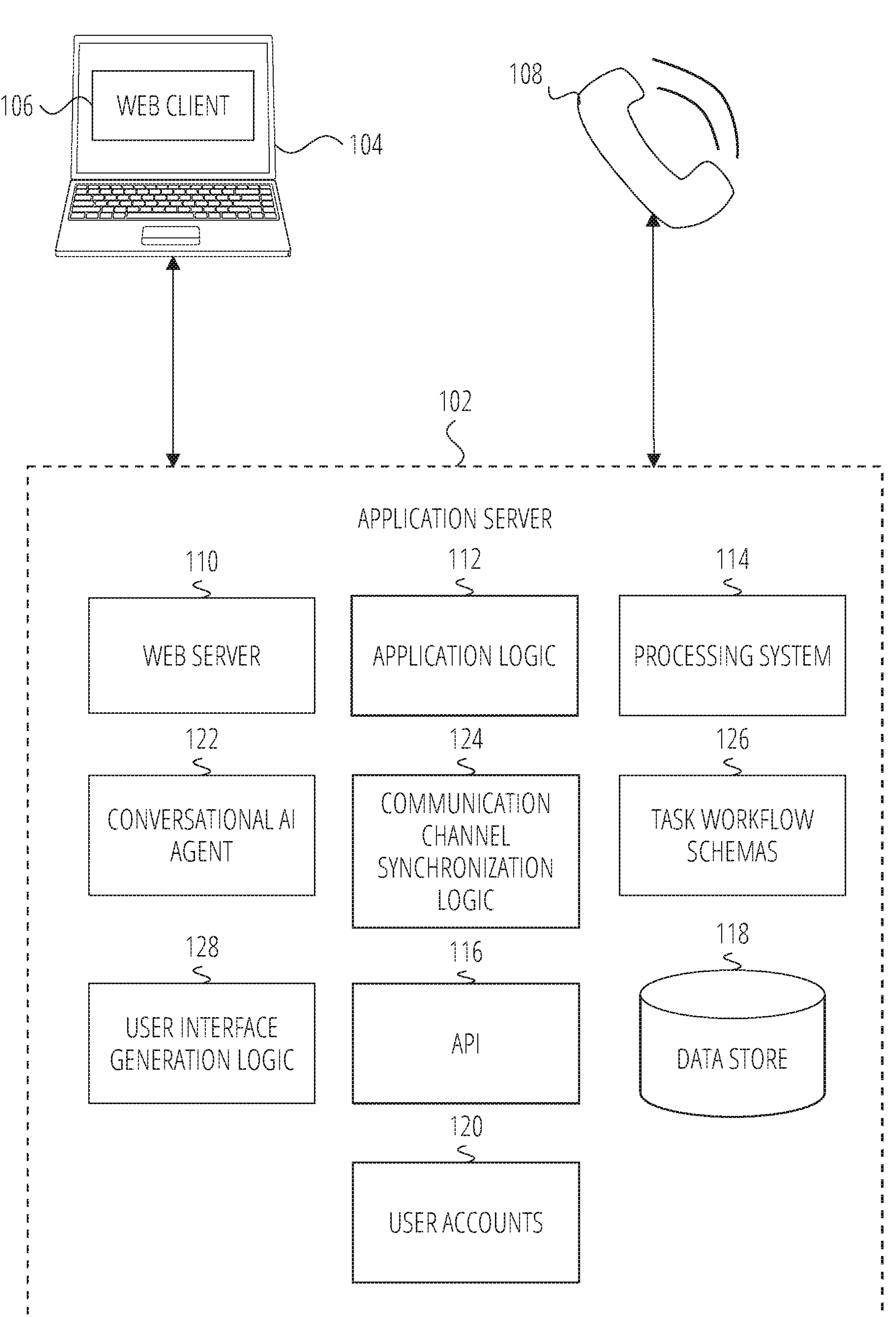
FIG. 1 is an illustration of components of a client device and an application server, according to various examples.

The following description outlines specific examples to provide a thorough understanding of various inventive aspects. It will be evident, however, to one skilled in the art that the present invention may be practiced without these specific details. References in the specification to "one example," "an example," "an illustrative example," etc., indicate that the example described may include a particular feature, structure, etc. Still, every example may not necessarily include that particular feature. Additionally, such phrases do not imply a single example, and the features may be incorporated into other examples described. It may be appreciated that lists in the form of "at least one A, B, and C" may mean (A); (B); (C): (A and B); (B and C); or (A, B, and C). Similarly, items listed in the form of "at least one of A, B, or C" can mean (A); (B); (C): (A and B); (B and C); or (A, B, and C). Furthermore, using such phrases does not negate the possibility of other options (e.g., (D)).

Throughout this disclosure, components may perform electronic actions in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. End-users or administrators may use user interfaces to edit the variable values.

In various examples described herein, user interfaces are described as being presented to a computing device. The presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples, these portions may be displayed on a screen simultaneously, in others, the portions/elements may be displayed on separate screens such that not all portions/elements are displayed simultaneously. Unless explicitly indicated as such, the use of "presenting a user interface" does not infer either one of these options.

Additionally, the elements and portions are sometimes described as being configured for a particular purpose. For example, an input element may be configured to receive an input string, a selection from a menu, a checkbox, etc. In this context, "configured to" may mean presenting a user interface element capable of receiving user input. "Configured to" may additionally mean computer executable code processes interactions with the element/portion based on an event handler. Thus, a "search" button element may be configured to pass text received in the input element to a search routine that formats and executes a structured query language (SQL) query to a database.

Conversational agents, also referred to as chatbots or virtual assistants, are software applications designed to simulate human-like conversations with users through text or voice interactions. These intelligent systems leverage a combination of pre-programmed rules and various forms of artificial intelligence (AI), including natural language processing (NLP) and machine learning (ML), to understand and respond to user queries naturally and intuitively. The underlying technology enables chatbots to process and interpret human language, recognize user intent, and generate relevant responses, facilitating interaction between the machine and human users. Conversational agents may be distinguished from pure Interactive Voice Response (IVR) systems in which a hierarchical menu is navigated using user selections (e.g., via a number pad on their phone) with no ML or AI.

Conversational agents are often deployed on mobile applications or websites. For a portion of the population, the use of mobile applications/websites may present challenges. These challenges may stem from a variety of factors, including unfamiliarity with technology, discomfort with non-traditional forms of interaction, or physical and mental barriers that make navigation and comprehension of digital content difficult. As a result, a segment of the population is often excluded from the full benefits of technological advancements, and businesses are compelled to allocate additional resources to accommodate these users through more traditional interaction methods, such as Interactive Voice Response (IVR) systems or live human agents.

However, IVR systems, while useful, are not sufficient for several reasons. IVR systems typically rely on hierarchical menus navigated via user selections, such as pressing numbers on a telephone keypad. This method can be restrictive and unintuitive, as it requires users to remember and navigate through multiple layers of menus to reach the desired option. Moreover, IVR systems lack the capability to process natural language, which can lead to frustration and inefficiency, particularly when dealing with complex inquiries or tasks that do not fit neatly into predefined categories. Furthermore, IVR systems alone are not equipped to provide visual feedback, which may be useful for understanding complex information. For example, if a user asks about a series of accounts, an IVR system may only be able to read out account details sequentially, which can be difficult for the user to follow and remember.

In view of these technical problems, described herein are methods to extend the advances in AI to audio-based systems by integrating conversational AI agents with dual communication channels, offering a technical improvement over pure IVR systems. The use of a conversational agent allows users to interact with the system using voice commands in their own words, without the constraints of a fixed menu structure. Furthermore, the systems and methods described overcome the non-visual nature of IVR by providing a synchronized visual display on a secondary device, such as a smartphone or computer, allowing users to see the information they are hearing. This dual-channel approach reduces cognitive load and enhances comprehension, as users can both hear and see the information, making it easier to process and interact with.

The technical nature of the methods and systems are further demonstrated by described dynamically managed instances of task types. These instances are updated in real time based on user inputs, ensuring that the visual display on the user's device is synchronized with the audio interaction. This approach addresses the insufficiencies of traditional IVR systems by offering a more natural, efficient, and accessible method of interaction, particularly for users who may be marginalized by the limitations of existing digital interfaces.

FIG. 1 illustrates the elements of a client device and an application server according to various examples. The figure presents an application server 102, a client device 104, a web client 106, an audio only phone 108, a web server 110, application logic 112, a processing system 114, an API 116, a data store 118, user accounts 120, a conversational AI agent 122, a communication channel synchronization logic 124, task workflow schemas 126, and user interface generation logic 128.

Application server 102 is illustrated as separate elements. However, the functionality of multiple individual elements may be performed by a single element. An element may represent computer program code executable by processing system 114 (e.g., such as computer system 400 with respect to FIG. 4). The program code may be stored on a storage device (e.g., data store 118) and loaded into the memory of the processing system 114 for execution. Portions of the program code may be executed in parallel across multiple processing units.

A processing unit may be a grouping of one or more cores of a general-purpose computer processor, a graphical processing unit, an application-specific integrated circuit, or a tensor processing core. Furthermore, the grouping may operate on a single device or multiple devices (either collocated or geographically dispersed). Accordingly, code execution using a processing unit may be performed on a single device or distributed across multiple devices. In some examples, using shared computing infrastructure, the program code may be executed on a cloud platform (e.g., MICROSOFT AZURE® and AMAZON EC2®).

Client device 104 may be a computing device which may be but is not limited to, a smartphone, tablet, laptop, multiprocessor system, microprocessor-based or programmable consumer electronics, game console, set-top box, or other device that a user utilizes to communicate over a network. In various examples, a computing device includes a display module (not shown) to display information (e.g., specially configured user interfaces). In some embodiments, computing devices may comprise one or more of a touch screen, camera, keyboard, microphone, or Global Positioning System (GPS) device.

Client device 104 and application server 102 may communicate via a network (not shown). The network may include local-area networks (LAN), wide-area networks (WAN), wireless networks (e.g., 802.11 or cellular network), Public Switched Telephone Network (PSTN), ad hoc networks, cellular, personal area networks or peer-to-peer (e.g., Bluetooth®, Wi-Fi Direct), or other combinations or permutations of network protocols and network types. The network may include a single Local Area Network (LAN), Wide-Area Network (WAN), or combinations of LANs or WANs, such as the Internet.

The audio only phone 108 may be an analog or digital phone that communicates using the PSTN or voice-over-IP (VOIP). However, the audio only phone 108 may not be capable of user interaction beyond receiving voice data and using touch tones via the number keys on the phone. Accordingly, the audio only phone 108 cannot run mobile apps or web applications.

Conversational AI agent 122 may be an artificial intelligence-based model for assisting users in performing different tasks. For example, conversational AI agent 122 may be a customer service assistant to retrieve balances of an account, make appointments, etc. In various examples, the conversational AI agent 122 may be multimodal. Thus, the conversational AI agent 122 may be configured to accept include as voice or via a graphical user interface. Similarly, the conversational AI agent 122 may output data in the form of voice or pictorially.

Initially, conversational AI agent 122 may capture user input, which can be in the form of text or voice (via web client 106 or audio only phone 108). Regarding text input, the conversational AI agent 122 may directly process the input. Speech recognition technology may be used to convert spoken language into text format for voice inputs.

Upon receiving the input, the agent may use natural language processing (NLP) algorithms to analyze and understand the context and intent of the user's query. This step involves parsing the input, identifying key terms and phrases, and understanding the semantics to gauge the user's request or question accurately. Sentiment analysis may also be utilized to discern the emotional tone behind the user's message. In various examples, the conversational AI agent 122 may utilize a large language model (LLM) to process the input using a transformer model.

Following receiving the input, the conversational AI agent 122 may formulate a response. The mechanism for formulating the response may be based on the architecture of the conversational AI agent 122. For example, conversational AI agent 122 may access a predefined knowledge base or make calls/queries to external databases and APIs to retrieve the information or perform the actions to address the user's request. This may involve querying databases for specific information, executing service-related tasks, or initiating processes that pertain to the user's input. The response may include data presented to the user and actions performed on the user's behalf. For example, if conversational AI agent 122 uses keywords to determine an intent, conversational AI agent 122 may query task workflow schemas 126 to retrieve questions to ask the user associated with the determined intent.

The task workflow schemas 126 may store structured sequences of actions that guide users through completing specific tasks. When the conversational AI agent 122 interacts with a user, it uses natural language processing to ascertain the user's intent (e.g., mapping keywords to tasks, using a neural network that outputs probabilities of each task). The AI agent then aligns the conversation with the corresponding task workflow schema. These schemas represent various processes or service requests, from relatively straightforward tasks such as checking the balance of an account.

A task workflow schema may be structured (e.g., defined in Extensible Markup Language (XML)) with a type identifier. The schema comprises various elements identifying the inputs required to complete the task. These elements may include specific input formats, such as numerical data for account numbers, date formats for scheduling, or text fields for personal information. The format of these inputs is designed to be compatible with both the conversational AI agent 122 and the user interface generation logic 128 so information may be accurately captured and displayed across different communication channels.

In addition to the elements requiring user input, a task workflow schema may identify external data sources for task completion using APIs or other data retrieval methods. For instance, a schema for a financial transaction might include a step where, after the user inputs are received, application logic 112 automatically initiates a call to a banking API to verify account status or retrieve real-time exchange rates.

A schema may also specify the order of operations in which inputs are collected, data is accessed, and calculations are performed. For example, a user may input the amount and currency for a foreign exchange transaction. The application logic 112 may query the latest currency conversion rates via an API, perform a calculation, and output the result to the user for confirmation.

After matching an intent to a task type, the conversational AI agent 122 may ask the user to confirm the identified task. For instance, if the user intends to transfer funds, the AI agent might ask, "Would you like to proceed with a funds transfer?" Following user confirmation, the AI agent continues with the task workflow schema that matches the confirmed intent, guiding the user through the necessary steps.

The task workflow schemas 126, in combination with the conversational AI agent 122, may be configured to adjust to changes during a conversation with a user. Should the user's requirements evolve or if an issue arises that was not initially anticipated, the conversational AI agent 122 may transition to an alternative workflow schema that more accurately addresses the user's current situation.

The conversational AI agent 122 may begin a conversation with a user via an audio communication channel, such as a customer service line, established with the audio only phone 108. When a user calls the designated customer service phone number, the application server 102 may authenticate the user to a user account (e.g., stored in user accounts 120). The authentication may be based on the number of the audio only phone 108, voice biometrics, a user answering security questions, etc.

Upon successful authentication, the application server 102 initiates the conversation by creating a session ID and associating it with a user account identifier (user ID). This session ID is a unique identifier that tracks and synchronizes the conversation across different communication channels and modalities.

As the conversational AI agent 122 begins interacting with the user, it audibly communicates with the user, guiding them through various options and gathering information. During this interaction, the application server 102 may continuously evaluate the user's needs and the complexity of the service request. If the application server 102 determines that a visual interface could enhance the user's experience, it triggers a process to extend the interaction to a second channel.

To facilitate this multi-channel experience, the application server 102 sends a notification (e.g., push notification, short message service, or e-mail) to another device (e.g., client device 104) of the user. This link contains the session ID and connects web client 106 to the ongoing session when the user activates it. The communication channel synchronization logic 124 may receive a signal from the web server 110 upon activation of the link. Then, the communication channel synchronization logic 124 may receive input from the audio only phone 108 and the web client 106.

The application server 102 may determine a user communicating via an audio channel would be better served by a dual-channel experience in several manners. For example, a determination may be made by application logic 112 through a combination of sentiment analysis, evaluation of the type and volume of data required, risk of misinterpretation using audio, as well as user preferences and demographics.

With respect to sentiment analysis, the conversational AI agent 122 may use a sentiment analysis algorithm to gauge the user's tone, pace, and choice of words during the audio interaction. If the user exhibits signs of frustration or confusion, the application logic 112 may infer that the user could benefit from another communication medium. Suppose the user repeatedly asks for clarification on a topic or responds with uncertainty. In that case, these cues suggest that a visual representation could enhance comprehension and ease the user's experience. The sentiment analysis may output a value (e.g., between 0 and 1) that indicates a frustration level above which a link may be suggested to establish the dual-device-communication session.

Certain user interactions may involve complex information or a large volume of data that can be challenging to convey and process audibly. For example, if a user wishes to perform a stock trade with 25 different stocks, there is a high chance that at least one number relayed audibly may be inaccurate. If the conversational AI agent 122 identifies that the user's request requires reviewing detailed information, such as comparing multiple account options or understanding intricate service terms, it may trigger the transition to a dual-device-communication session to present the data visually, facilitating easier digestion and decision-making. The tasks within task workflow schemas 126 may include a rating of (e.g., one to ten) difficulty concerning audio-only performance. If a user's intent is mapped to a task with a high degree of difficulty (e.g., above seven), a dual-device-communication session may be offered to the user.

Similarly, audio communication may sometimes lead to misunderstandings, especially when dealing with complex instructions, technical language, or sensitive information. The conversational AI agent 122 may be configured to recognize scenarios (e.g., based on an identified task in the task workflow schemas 126) with a higher risk of misinterpretation. In such cases, providing a visual interface may help clarify the information and reduce potential errors.

In addition to derived signals based on the user's real-time information, application logic 112 may access user profile data. The user profile data may include stored preferences for communication channels. Suppose a user has previously indicated a preference for visual aids or has a history of using web-based services. In that case, the conversational AI agent 122 may proactively offer the dual-communication channel option to align with the user's known preferences even if the conversation was started using a device such as audio only phone 108.

Demographic information, such as age or accessibility requirements, may also influence the decision to offer a dual-device-communication session. For instance, elderly users or individuals with certain disabilities might find visual interfaces more navigable than audio-only interactions. The conversational AI agent 122 may use demographic data stored in a user's profile to tailor the service approach.

The conversational AI agent 122 may utilize a quantitative measure based on one or more of the above factors to decide when to offer a dual-device-communication session to a user. For example, numerical values may be assigned factors such as sentiment analysis, the complexity and volume of data, risk of misinterpretation, user preferences, and demographics. Each factor may be weighted according to its importance, and the weights may be stored as a formula in data store 118. For instance, sentiment analysis might be more heavily weighted in scenarios where user frustration is a strong indicator of the need for visual support. Similarly, the necessity to convey complex data might have a high weight when the interaction involves financial details or technical specifications.

The weighted value of each factor may be aggregated to produce a composite score. Suppose the composite score exceeds a predetermined threshold. In that case, it indicates a likelihood the user would benefit from a dual-device-communication session and prompt (e.g., transmit a notification with a link) the conversational AI agent 122 to offer the dual-device-communication path.

Once the link is activated and the web client 106 is engaged, the user may be presented with a visual interface (e.g., as generated by user interface generation logic 128) that complements the audio interaction. For instance, the conversational AI agent 122 may prompt the user to select from a series of options that are now visually displayed on the web client 106. The options may be based on the determined workflow in task workflow schemas 126. The user may interact (e.g., click with a mouse or touch with a finger) with the visual interface to make a selection, and the conversational AI agent 122 may acknowledge and respond to the selection audibly through the audio-only phone 108.

The communication channel synchronization logic 124 may be configured such that inputs from the web client 106 and the audio-only phone 108 are integrated and associated with the same session ID. For example, inputs made via a user interface may be passed to the conversational AI agent 122 in real time, allowing the agent to maintain a coherent conversation that spans both audio and visual channels.

The application server 102 may implement one or more Application Programming Interfaces (e.g., API 116). An API provides a method for computing processes to exchange data or perform actions. A web-based API may permit communications between two or more computing devices, such as web client 106 and application server 102. The API may define a set of HTTP calls according to Representational State Transfer (RESTful) practices. For example, A RESTful API may define various GET, PUT, POST, and DELETE methods to create, replace, update, and delete data stored in a database (e.g., data store 118). APIs may also be used to perform tasks defined by task workflow schemas 126.

APIs may also be defined in frameworks provided by an operating system (OS) to access data in an application that an application may not regularly be permitted to access. For example, the OS may define an API call to obtain the current location of a mobile device (e.g., client device 104) the OS is installed on. In another example, an application provider may use an API call to request a user be authenticated using a biometric sensor on the mobile device. By segregating any underlying biometric data—e.g., by using a secure element on the mobile device—the risk of unauthorized transmission of the biometric data may be lowered.

Application server 102 may include web server 110 to enable data exchanges with client device 104 via web client 106. Although generally discussed in the context of delivering webpages via the Hypertext Transfer Protocol (HTTP), other network protocols may be utilized by web server 110 (e.g., File Transfer Protocol, Telnet, Secure Shell, etc.). A user may enter a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 110. In response, web server 110 may transmit a web page rendered on a client device's display device (e.g., a mobile phone, desktop computer, etc.).

Additionally, web server 110 may enable users to interact with one or more web applications provided in a transmitted web page. A web application may provide user interface (UI) components rendered on a display device of the client device 104. The user may interact (e.g., select, move, enter text into) with the UI components, and, based on the interaction, the web application may update one or more portions of the web page. A web application may be executed in whole or in part locally on client device 104. The web application may populate the UI components with data from external or internal sources (e.g., data store 118) in various examples. For example, the web application may be a visual interface for interacting with the conversational AI agent 122.

The functions of the application server 102—including the web application—may be executed according to application logic 112. For example, application logic 112 may issue API calls to retrieve or store data from data store 118 and transmit it for display on client device 104. Similarly, data entered by a user into a UI component may be transmitted using API 116 back to the web server. Application logic 112 may use other elements (e.g., conversational AI agent 122, Communication channel synchronization logic 124, task workflow schemas 126, etc.) of application server 102 to perform functionality associated with the web application as described further herein.

Data store 118 may store data that is used by application server 102. Data store 118 is depicted as a singular element but may be multiple data stores. The data store 118 may include several databases of varying model architectures such as, but not limited to, a relational database (e.g., SQL), a non-relational database (NoSQL), a flat-file database, an object model, a document details model, graph database, shared ledger (e.g., blockchain), or a file system hierarchy. Data store 118 may store data on one or more storage devices (e.g., a hard disk, random access memory (RAM), etc.). The storage devices may be in standalone arrays, part of one or more servers, and located in one or more geographic areas.

Data structures may be implemented in several ways depending on the programming language of an application or the database management system used by an application. For example, if C++ is used, the data structure may be implemented as a struct or class. In the context of a relational database, a data structure may be defined in a schema.

User accounts 120 may include user profiles on users of application server 102. A user profile may include credential information such as a username and hash of a password. A user may enter their username and plaintext password on a login page of application server 102 to view their user profile information or interfaces presented by application server 102 in various examples. A user account may also include the user's preferences. The preferences may include communication preferences. For example, the communication preference may indicate a preference for audio interactions over visual interfaces (or the reverse).

A user account may also identify computing devices or email addresses associated with the user. For example, users may register one or more phones, desktop computers, tablets, or laptops with application server 102. Registering may include authorizing application server 102 to retrieve data from these devices, such as location data, browser history, etc. Users may revoke access to such data anytime by updating their profile. The data may be gathered via an application installed on a registered device, such as by downloading an application from an app store associated with their mobile phone platform. When the conversational AI agent 122 determines a dual-device-communication session should be established, the notification may be transmitted to one or more of the registered devices or email addresses.

"Associated" in the context of linking an account to a user profile (or other data linkages described herein) may be implemented differently depending on the underlying database system. For example, in a relational database management system (RDBMS), "associated" may refer to the relationship between tables. The relationship could be one-to-one, one-to-many, or many-to-many, established through foreign key constraints. For example, in a one-to-many relationship, a record in Table A (e.g., the user profile table) may be associated with multiple records in Table B (e.g., a user account table), using a foreign key in Table B that references the primary key in Table A.

Figure 2:
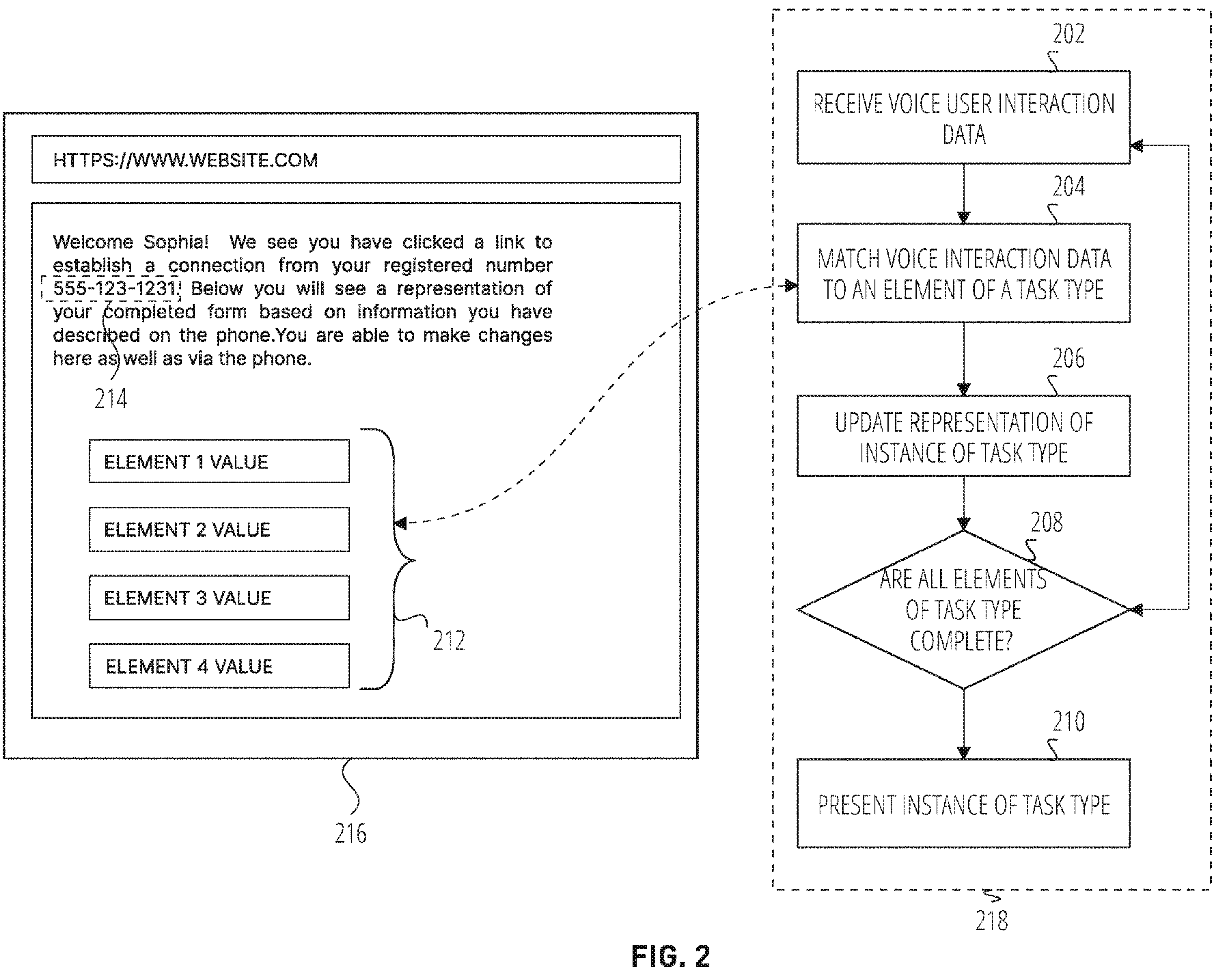
FIG. 2 is a diagram of a user interface and flowchart for processing user interactions, according to various examples.

FIG. 2 is a diagram of a user interface and flowchart for processing user interactions, according to various examples. The set of operations (e.g., operation 202 to operation 210) in flowchart 218 may be performed after conversational AI agent 122 has established a dual-device-communication session. For example, a user may have activated a link sent to the user's email address. The link may be configured to (e.g., as a hyperlink) open a web browser on their device (e.g., client device 104) and navigate them to a website such as presented in the user interface 216. The user may receive a welcome message with a number identifying the audio channel. For example, in FIG. 2, audio device identifier 214 is a phone number. Within user interface 216, task elements 212 are presented. Task elements 212 may be presented with values, if received, based on user input using an audio only device (e.g., audio only phone 108).

Although not illustrated, users may be asked to authenticate themselves to ensure a malicious actor is not using the link. For example, a user may be asked to enter a code on user interface 216 relayed to them to audibly over the audio channel using the audio only phone 108 or enter their credentials. For example, the link may be configured to open a mobile app on the client device 104. The mobile app may have been downloaded from an app store and be associated with application server 102. If a user has already authenticated with the mobile app (e.g., using biometrics), the user may not be required to authenticate again. Instead, the application server 102 may authenticate the user by checking the user ID of the user signed into the mobile app to the user ID of the user communicating via the audio only phone 108.

At operation 202 in flowchart 218, voice user interaction data may be received at application server 102 via a first device (e.g., audio only phone 108). Voice user interaction data may include a user's spoken inputs captured via the audio channel, which may include responses to prompts, commands, or selections from a menu of options. For flowchart 218, assume a task type has already been determined (e.g., using the methodologies discussed in FIG. 1.)

Once a task type has been determined, an instance of the task type may be generated. An instance of the task type is an instantiation of the task workflow schema created by the application logic 112 for the user's current session. The instance may be represented as a data structure that includes fields for each element required by the task type, which is populated with the user's inputs as the task progresses. If the task requires a selection from a series of options, the instance is updated to reflect the user's choice. Accordingly, at operation 204, the voice user interaction data may be matched to an element of a task type. At operation 206, the representation of the instance of the task type may be updated according to the received voice user interaction data.

At decision block 208, the application logic 112 may determine if all elements of a task type are complete (e.g., answers have been received). For example, application logic 112 evaluates whether all elements of the task type are complete—e.g., have all inputs have been received, and the instance of the task type is fully populated with the user's data.

If the evaluation of decision block 208 is True, at operation 210, the task type instance may be presented. This presentation may occur within user interface 216 and includes a summary of the task elements and the information provided by the user over the audio channel. The user can review the completed instance for accuracy and either confirm the details for final processing or make corrections as necessary. For example, a user may change the value using an input device (e.g., of client device 104). If a change is made, the task type's representation may also be updated. If further inputs are needed, the flow may continue back to operation 202. In various examples, the task type is associated with a particular form (e.g., a portable document format (PDF)). In such instances, the presentation may include a completed PDF form.

Figure 3:
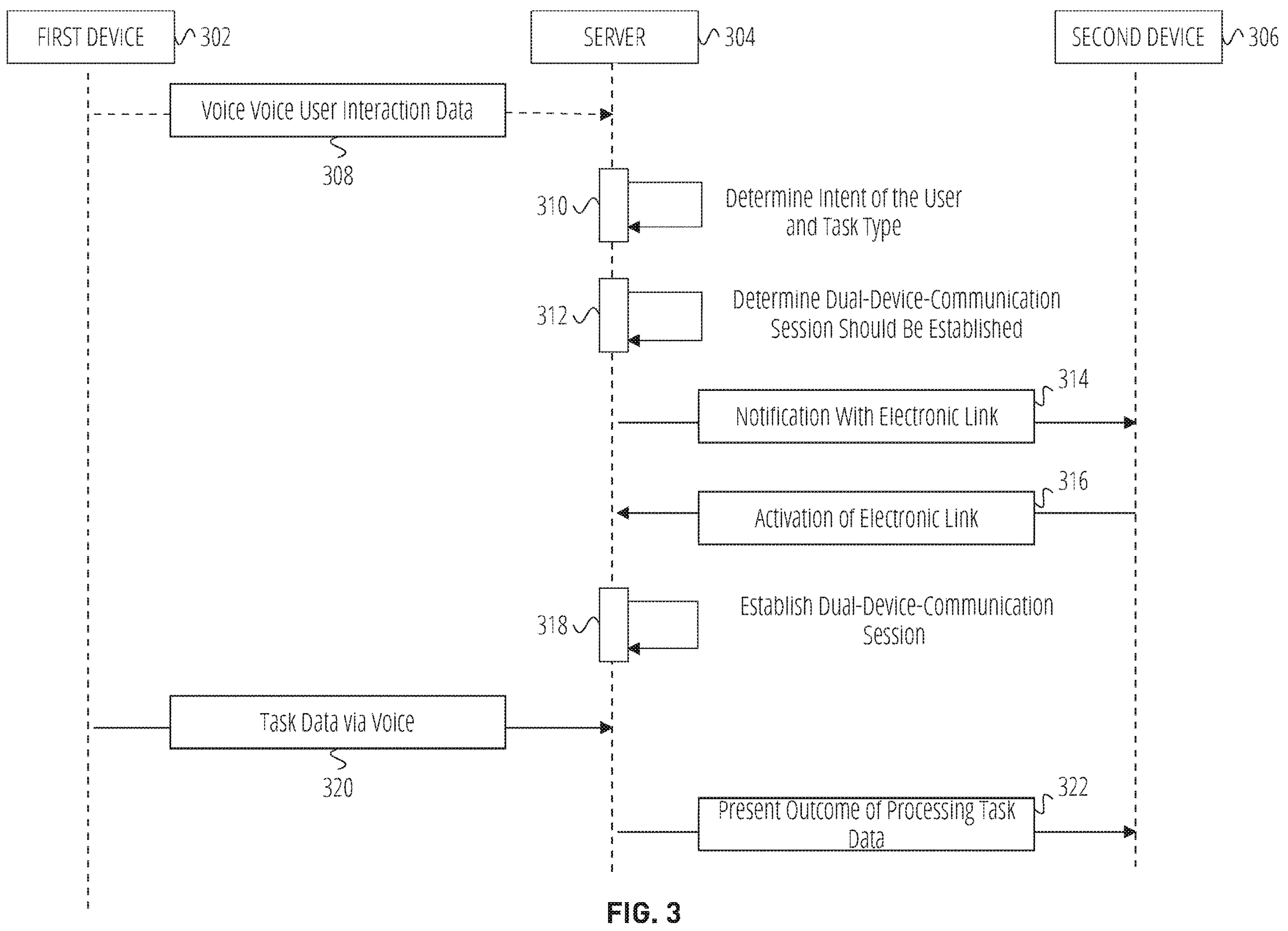
FIG. 3 is a dataflow diagram illustrating a method to establish and use a dual-device-communication session.

FIG. 3 is a dataflow diagram illustrating a method to establish and use a dual-device-communication session. FIG. 3 includes first device 302, server 304, and second device 306. In various examples, the first device 302 may be a device such as audio only phone 108, second device 306 may be client device 104, and server 304 may be application server 102 as described with respect to FIG. 1.

The method elements are represented as a set of blocks that describe operation 308 to operation 322. The method may be embodied in a set of instructions stored in at least one computer-readable storage device of a computing device. A computer-readable storage device excludes transitory signals. In contrast, a signal-bearing medium may include such transitory signals. A machine-readable medium may be a computer-readable storage device or a signal-bearing medium. A processing unit, which when executing the set of instructions, may configure the processing unit to perform the operations illustrated in FIG. 3. The processing unit may instruct other components of a computing device to carry out the set of instructions. For example, the processing unit may instruct a network device to transmit data to another computing device or the computing device may provide data over a display interface to present a user interface. In some examples, the performance of the method may be split across multiple computing devices using a shared computing infrastructure (e.g., the processing unit encompasses multiple distributed computing devices).

In various examples, operation 308 includes receiving at server 304, voice user interaction data via a virtual assistant from the first device (e.g., first device 302) of the user. For example, the virtual assistant may be configured as conversational AI agent 122 described in FIG. 1. The user may have called a customer service line using a phone over a first network type (e.g., a public switched telephone network) for help with a particular task. In various examples, the first device is not capable of presenting web application data or having a display beyond that to see a number being called or received.

In various examples, operation 310 includes processing, by the virtual assistant, the voice user interaction data to determine an intent of the user associated with a task type. The intent may be based on keywords, NLP, etc., as described in FIG. 1 with respect to conversational AI agent 122.

In various examples, operation 312 includes determining that a dual-device-communication session should be established based on the intent. For example, a weighted average of factors (e.g., characteristics of the user retrieved from a database, such as a user profile) may be calculated by server 304, and if the average is above a threshold, a dual-device-communication session should be offered to the user. Prior to operation 314, a message may be audibly relayed over the first network type to first device 302, asking if the user would like to establish the dual-device-communication session. In various examples, the user may respond affirmatively, operation 314 may proceed.

In various examples, operation 314 includes transmitting a notification to the second device 306 of the user. The notification may include an electronic link to establish the dual-device-communication session. The device the notification is sent to, and the type (e.g., push or email) of notification, may be determined by the user relaying a preference as audio data to the conversational AI agent 122 or prior stored preferences.

The notification may be a push notification and the electronic link is configured to open a mobile application on the second device to present an interface. The user may authenticate themselves to the mobile application on the second device using voice data received from the first device. For example, the conversational AI agent 122 may relay an authentication code that the user may enter into the mobile application of the second device 306. In another example, the notification may be an e-mail message and the electronic link is configured to open a web page on the second device.

In various examples, operation 316 includes receiving an indication of activation of the electronic link from the second device. The indication (e.g., an HTML GET request) may be received over a second network interface type such as a packet-switched network like the Internet.

In various examples, operation 318 includes, in response to receiving the indication, establishing the dual-device-communication session with the first device and the second device. The dual-device-communication session may be associated with an instance of the task type.

The establishing may also include generating a session identifier; associating the first device with the session identifier in a database; and associating the second device with the session identifier in the database. When data is transmitted from second device 306 to server 304 the session may be transmitted as a parameter. Thus, server 304 (e.g., using communication channel synchronization logic 124) may be able to match the data to the communication session being had with the first device 302.

In various examples, operation 320 includes, subsequent to the establishment, receiving task data from the first device via the virtual assistant associated with the task type. For example, as indicated in FIG. 1, task workflow schemas 126 may identify the elements used for completing the task. Accordingly, the method of FIG. 3 may further include electronically processing the task data received from the device to match the task data to an input element associated with the task type. Processing may include updating the representation (e.g., data structure) of an instance of the task type.

In various examples, operation 322 includes, in response to receiving the task data, presenting an outcome of processing the task data. The outcome may be presented on a user interface on the second device 306. For example, the outcome may be presented as a filled in input element of a form template (e.g., PDF) associated with the task type.

Figure 4:
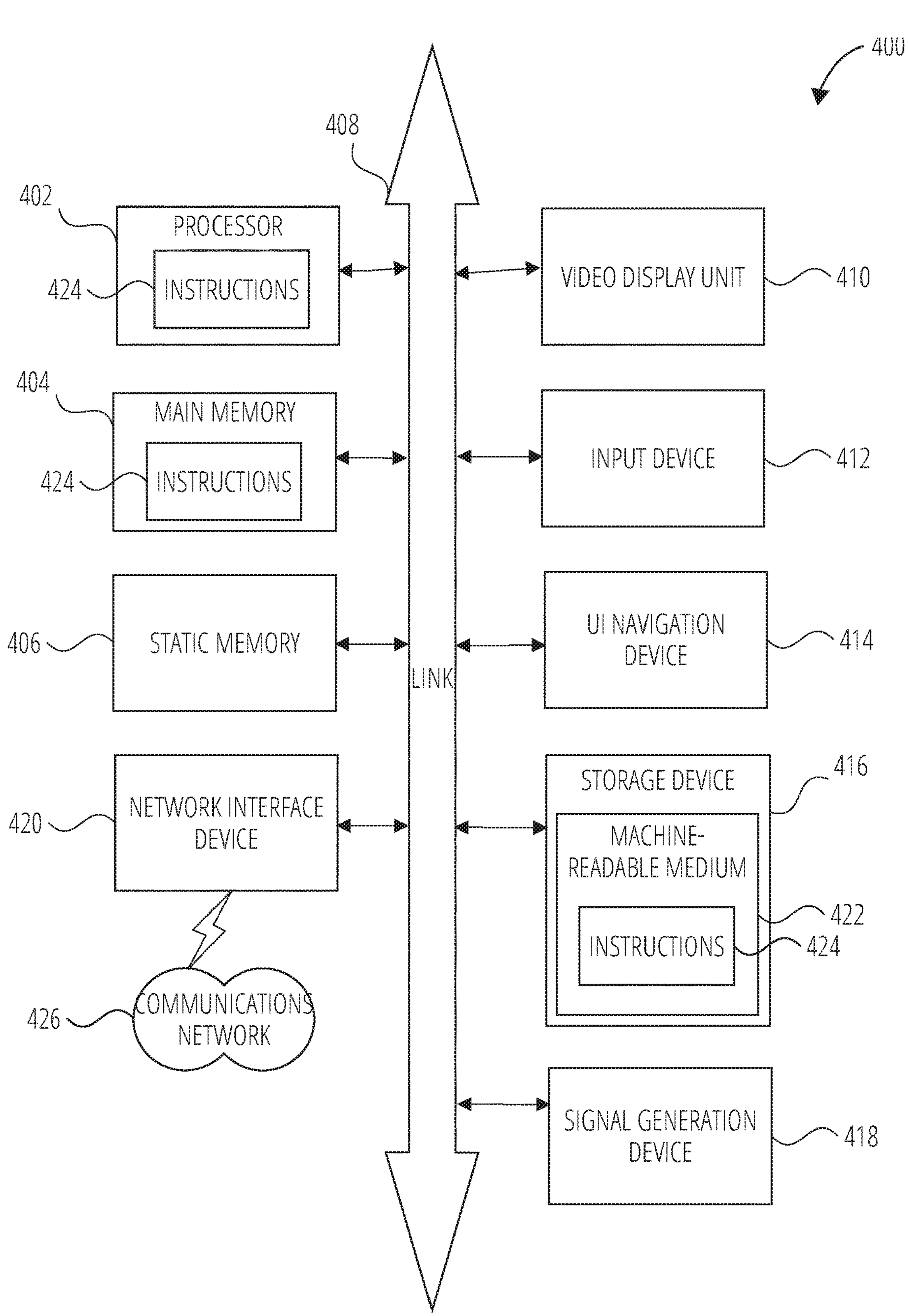
FIG. 4 is a block diagram illustrating a machine in the example form of computer system, within which a set or sequence of instructions may be executed to cause the machine to perform any one of the methodologies discussed herein, according to various examples.

FIG. 4 is a block diagram illustrating a machine in the example form of computer system 400, within which a set or sequence of instructions may be executed to cause the machine to perform any of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) Network environments. The machine may be an onboard vehicle system, wearable device, personal computer (PC), tablet PC, hybrid tablet, personal digital assistant (PDA), mobile telephone, or any machine capable of executing instructions (sequential or otherwise) that specify actions to be taken by that machine. Further, while only a single machine is illustrated, the term "machine" includes any collection of machines that individually or jointly execute a set (or multiple sets) of instructions to perform any of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein Example computer system 400 includes at least one processor 402 (e.g., a central processing unit (CPU), a graphics processing unit (GPU) or both, processor cores, compute nodes, etc.), a main memory 404, and a static memory 406, which communicate with each other via a link 408. The computer system 400 may include a video display unit 410, an input device 412 (e.g., a keyboard), and a user interface UI navigation device 414 (e.g., a mouse). In an example, the video display unit 410, input device 412, and UI navigation device 414 are incorporated into a single device housing, such as a touchscreen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensors.

The storage device 416 includes a machine-readable medium 422 on which one or more sets of data structures and instructions 424 (e.g., software) embodying or utilized by any of the methodologies or functions described herein. The instructions 424 may also reside, completely or at least partially, within the main memory 404, the static memory 406, or within the processor 402 during execution thereof by the computer system 400, with the main memory 404, the static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database or associated caches and servers) that store the instructions 424. The term "machine-readable medium" shall also be taken to include any tangible medium that is capable of storing, encoding, or carrying instructions for execution by the machine and that causes the machine to perform any one or more of the methodologies of the present disclosure or that is capable of storing, encoding or carrying data structures utilized by or associated with such instructions. The term "machine-readable medium" includes, but is not limited to, solid-state memories and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 422 that excludes transitory signals.

The instructions 424 may be transmitted or received over a communications network 426 using a transmission medium via the network interface device 420 utilizing a transfer protocol (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine and includes digital or analog communications signals or other intangible mediums to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A computer-implemented method comprising:
receiving voice user interaction data via a virtual assistant from a first device of a user;
processing, by the virtual assistant, the voice user interaction data to determine an intent of the user associated with a task type;
determining that a dual-device-communication session should be established based on the intent;
transmitting a notification to a second device of the user, the notification including an electronic link to establish the dual-device-communication session;
receiving an indication of activation of the electronic link from the second device;
in response to receiving the indication, establishing the dual-device-communication session with the first device and the second device, the dual-device-communication session associated with an instance of the task type, wherein the dual-device-communication session maintains a conversation that spans both the first device and the second device concurrently, the first device used as an audio channel and the second device used as a visual channel for the dual-device-communication session;
subsequent to the establishing, receiving task data from the first device via the virtual assistant associated with the task type; and
in response to receiving the task data, presenting an outcome of processing the task data, the outcome presented on a user interface on the second device.

2. The method of claim 1, wherein establishing the dual-device-communication session includes:
generating a session identifier;
associating the first device with the session identifier in a database; and
associating the second device with the session identifier in the database.

3. The method of claim 1, further comprising:
electronically processing the task data received from the device to match the task data to an input element associated with the task type.

4. The method of claim 3, wherein the outcome is presented as a filled in input element of a form template associated with the task type.

5. The method of claim 1, wherein the notification is a push notification and the electronic link is configured to open a mobile application on the second device.

6. The method of claim 5, further comprising:
authenticating the user to the mobile application on the second device using voice data received from the first device.

7. The method of claim 1, wherein the notification is an e-mail message and the electronic link is configured to open a web page on the second device.

8. The method of claim 1, wherein determining that the dual-device-communication session should be established based is further based on characteristics of the user retrieved from a database.

9. The method of claim 1, wherein the first device is not capable of presenting web application data.

10. The method of claim 1, wherein receiving the voice user interaction includes receiving the voice user interaction via a first network interface type.

11. The method of claim 10, wherein the first network interface type is configured to use a public switched telephone network.

12. A non-transitory computer-readable medium comprising instructions, which when executed by a processing unit, configure the processing unit to perform operations comprising:

receiving voice user interaction data via a virtual assistant from a first device of a user;

processing, by the virtual assistant, the voice user interaction data to determine an intent of the user associated with a task type;

determining that a dual-device-communication session should be established based on the intent;

transmitting a notification to a second device of the user, the notification including an electronic link to establish the dual-device-communication session;

receiving an indication of activation of the electronic link from the second device;

in response to receiving the indication, establishing the dual-device-communication session with the first device and the second device, the dual-device-communication session associated with an instance of the task type, wherein the dual-device-communication session maintains a conversation that spans both the first device and the second device concurrently, the first device used as an audio channel and the second device used as a visual channel for the dual-device-communication session;

subsequent to the establishing, receiving task data from the first device via the virtual assistant associated with the task type; and in response to receiving the task data, presenting an outcome of processing the task data, the outcome presented on a user interface on the second device.

13. The non-transitory computer-readable medium of claim 12, wherein establishing the dual-device-communication session includes:

generating a session identifier;

associating the first device with the session identifier in a database; and associating the second device with the session identifier in the database.

14. The non-transitory computer-readable medium of claim 12, wherein the instructions, which when executed by the processing unit, further configure the processing unit to perform operations comprising:

electronically processing the task data received from the device to match the task data to an input element associated with the task type.

15. The non-transitory computer-readable medium of claim 14, wherein the outcome is presented as a filled in input element of a form template associated with the task type.

16. The non-transitory computer-readable medium of claim 12, wherein the notification is a push notification and the electronic link is configured to open a mobile application on the second device.

17. The non-transitory computer-readable medium of claim 16, wherein the instructions, which when executed by the processing unit, further configure the processing unit to perform operations comprising:

authenticating the user to the mobile application on the second device using voice data received from the first device.

18. The non-transitory computer-readable medium of claim 12, wherein the notification is an e-mail message and the electronic link is configured to open a web page on the second device.

19. The non-transitory computer-readable medium of claim 12, wherein determining that the dual-device-communication session should be established based is further based on characteristics of the user retrieved from a database.

20. A system comprising:

a processing unit; and a storage device comprising instructions, which when executed by the processing unit, configure the processing unit to perform operations comprising:

receiving voice user interaction data via a virtual assistant from a first device of a user;

processing, by the virtual assistant, the voice user interaction data to determine an intent of the user associated with a task type;

determining that a dual-device-communication session should be established based on the intent;

transmitting a notification to a second device of the user, the notification including an electronic link to establish the dual-device-communication session;

receiving an indication of activation of the electronic link from the second device;

in response to receiving the indication, establishing the dual-device-communication session with the first device and the second device, the dual-device-communication session associated with an instance of the task type, wherein the dual-device-communication session maintains a conversation that spans both the first device and the second device concurrently, the first device used as an audio channel and the second device used as a visual channel for the dual-device-communication session;

subsequent to the establishing, receiving task data from the first device via the virtual assistant associated with the task type; and in response to receiving the task data, presenting an outcome of processing the task data, the outcome presented on a user interface on the second device.

* * * * *